(12) United States Patent
Fisher

(10) Patent No.: US 9,004,574 B1
(45) Date of Patent: Apr. 14, 2015

(54) E Z ROLLER

(71) Applicant: Carroll Fisher, The Villages, FL (US)

(72) Inventor: Carroll Fisher, The Villages, FL (US)

( * ) Notice: Subject to any disclaimer, the term of this patent is extended or adjusted under 35 U.S.C. 154(b) by 0 days.

(21) Appl. No.: 13/987,466

(22) Filed: Jul. 29, 2013

(51) Int. Cl.
*B60J 11/02* (2006.01)
*B60J 7/10* (2006.01)

(52) U.S. Cl.
CPC ............... *B60J 7/102* (2013.01); *B60J 11/025* (2013.01)

(58) Field of Classification Search
CPC .......... B60J 11/02; B60J 11/025; B60J 11/06; B60J 11/08
USPC ........... 296/138, 77.1, 79, 80, 83; 280/DIG. 5
See application file for complete search history.

(56) References Cited

U.S. PATENT DOCUMENTS

| | | | |
|---|---|---|---|
| 2,547,692 A * | 4/1951 | D Azzo ........................... | 160/45 |
| 2,845,671 A * | 8/1958 | Fischer et al. ................. | 24/458 |
| 3,089,541 A * | 5/1963 | Lockshin ....................... | 160/383 |
| 5,010,941 A * | 4/1991 | Ross et al. .................... | 160/330 |
| 5,099,906 A * | 3/1992 | Chigusa et al. ............... | 160/297 |
| 5,607,200 A * | 3/1997 | Smidler ....................... | 296/186.2 |
| 5,921,609 A * | 7/1999 | Mills et al. .................... | 296/138 |
| 7,614,439 B2 * | 11/2009 | Lukos ........................... | 160/392 |
| 7,740,300 B2 * | 6/2010 | Marsh et al. .................... | 296/83 |
| 7,832,788 B2 * | 11/2010 | Marsh et al. ............... | 296/146.1 |
| 8,172,301 B2 * | 5/2012 | Searfoss ........................ | 296/98 |
| 8,291,960 B2 * | 10/2012 | Bowman ..................... | 160/267.1 |
| 8,490,672 B2 * | 7/2013 | Dieckmann ................... | 160/392 |
| 2008/0264572 A1 * | 10/2008 | Forst Randle ............. | 160/84.05 |
| 2013/0199735 A1 * | 8/2013 | Colson et al. ..................... | 160/2 |

FOREIGN PATENT DOCUMENTS

DE     29511733 U1 * 11/1995

* cited by examiner

*Primary Examiner* — H Gutman
(74) *Attorney, Agent, or Firm* — Frank A. Lukasik

(57) ABSTRACT

A roll-up golf cart side curtain having a rigid PVC pipe installed on the bottom of said curtain to assist in quickly rolling up the curtain into a neat, compact position. The rigid pipe is cut down one side, along the entire length and installed on the bottom of the curtain.

2 Claims, 3 Drawing Sheets

E Z ROLLER

FIELD OF THE INVENTION

The present invention relates generally to an improved system for "rolling-up" a side curtain, on a golf cart, and particularly to attaching a pipe on the bottom of the front curtain to assist in quickly rolling up the curtain into a neat, compact position.

BACKGROUND OF THE INVENTION

Golf cart covers are utilized to protect the occupants of the cart from adverse weather conditions and insects. The covers generally protect the front, sides and rear of the cart by covering the openings of the cart with panels made of vinyl, cloth or other similar materials. Golf carts typically have hard top covers to protect the occupants from the sunlight. Golf cart covers are generally attached to or are supported by the top of the cart and have the side panels of the cover secured to the body of the cart.

Commonly, a rear panel and left and right side panels are provided, however, unless the golf cart is fitted with a hard windshield, a front panel serving as a windshield may also be provided. To allow passenger ingress and egress and allow access to the golf clubs stored at the rear of the golf cart, the panels are commonly secured either to the adjacent panels by zippers or similar fasteners or to vertical side posts that support the roof structure.

Historically, many patents have taught panels for golf carts that protect the occupants from inclement weather. For example, U.S. Pat. No. 7,354,092 discloses a golf cart enclosure comprising a front, rear and/or side panels suspended about the periphery of the roof structure of a golf cart. One or more panel pockets are positioned about the periphery of the roof structure immediately above one or more of the panel(s) such that they may be rolled up for storage.

U.S. Pat. No. 4,773,694 discloses a golf cart enclosure comprising a roof panel having a configuration corresponding to the configuration of the roof structure of the golf cart and front, rear and side panels suspended therefrom about the periphery of the golf cart to completely enclose the golf cart. The roof panel of the enclosure comprises a peripheral hem which allows each panel suspended therefrom to be folded and rolled upwardly and then tucked under the roof panel. The peripheral flap is then fastened to the rim of the roof structure of the golf cart.

U.S. Pat. No. 7,832,788 discloses an improved door design for soft-sided golf cart covers. This product features a horizontal swing out design that removes the need for snaps or zippers and increases size of the door opening. This door features a magnetic door that eliminates zipper failure, amplifies entry and exit and improves the longevity of the cover.

U.S. Pat. No. 5,429,404 discloses a golf cart enclosure system including flexible portable strips of see-through plastic which extend across the vertical dimension between the golf cart canopy and the golf cart body, the top ends of the flexible strips being attached with a semi-permanent attachment device to the golf cart canopy in a rear-to-front overlapping fashion, so that during forward motion of the cart, the strips remain in position and in contact with one another: the bottom ends of the strips connected to the golf cart body by permanent magnets, or electromagnets wired to the golf cart battery and activated either automatically by the driver's footpad, or by an on-board switch.

U.S. Pat. No. 8,281,842 discloses a window blind unit, a curtain member unit and a clamping unit. The roller blind unit includes a roller rod that extends horizontally and that is rotatably mounted at or in proximity to an upper edge portion of the window, and a roller blind piece a top edge of which is connected to the roller rod and which is able to be wound around and extended from the roller rod.

U.S. Pat. No. 8,291,960 relates to roll up doors of the type employing flexible sheets forming curtains for closing doorways and, in particular to bottom bar apparatus for roll-up doors which are mountable on the lower ends of the door curtains.

U.S. Pat. No. 8,418,741 discloses a roller blind device comprising a flat circular tube for fixing the upper end of the special curtain and a second circular tube for fixing the lower end of the special curtain.

SUMMARY OF THE INVENTION

According to one aspect of the present disclosure, an improved system for "rolling-up" side curtains, on golf carts and particularly to installing a pipe on the bottom of the front curtain to assist in quickly rolling up the curtain into a neat, compact position. Golf carts are usually sold with side protective curtains which require manual labor to "roll-up" and secure near the top of the golf cart. This effort is hard and frustrating for one person to complete, (especially on a windy day) and usually results in an unattractive, not uniform job.

The instant invention is a system for improving this task by installing a pipe on the bottom of the front curtain. The pipe is made from PVC ¾ inch pipe which has been cut in 40 inch lengths, then cut with a table saw, using a dado blade, down one side, the length of the pipe. The bottom edge of the curtain is placed in the cut of the PVC pipe thereby forming an easy way to roll the curtain up.

With the pipe in place, it becomes easy for one person to quickly "roll-up" the curtain into a neat, compact position.

DESCRIPTION OF THE PREFERRED EMBODIMENT

Figure 1:
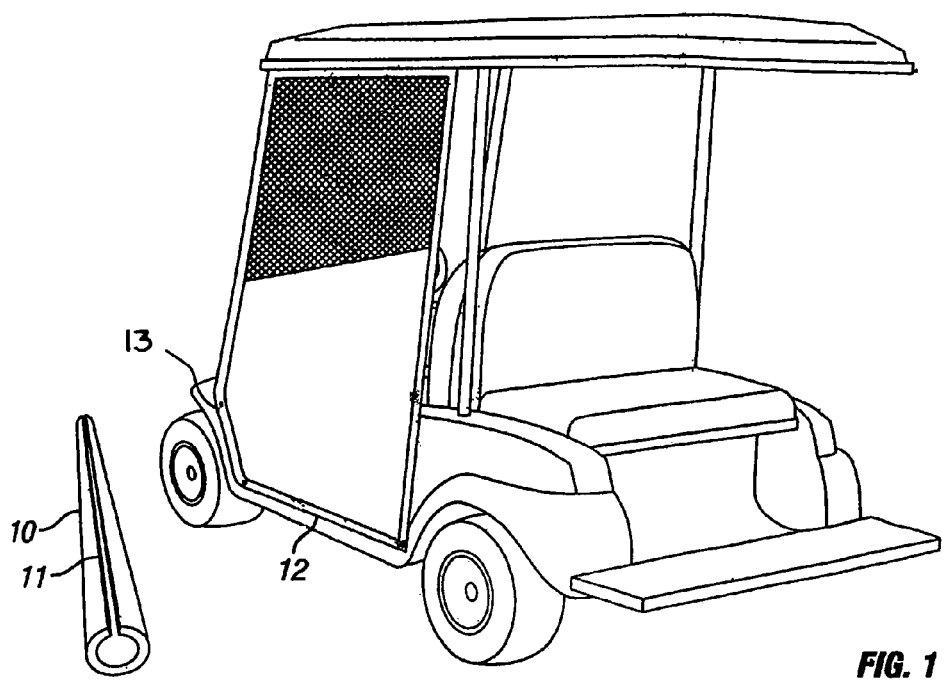
FIG. 1 is a rear perspective view of the apparatus of the present invention as it appears prior to a pipe being installed.
Figure 2:
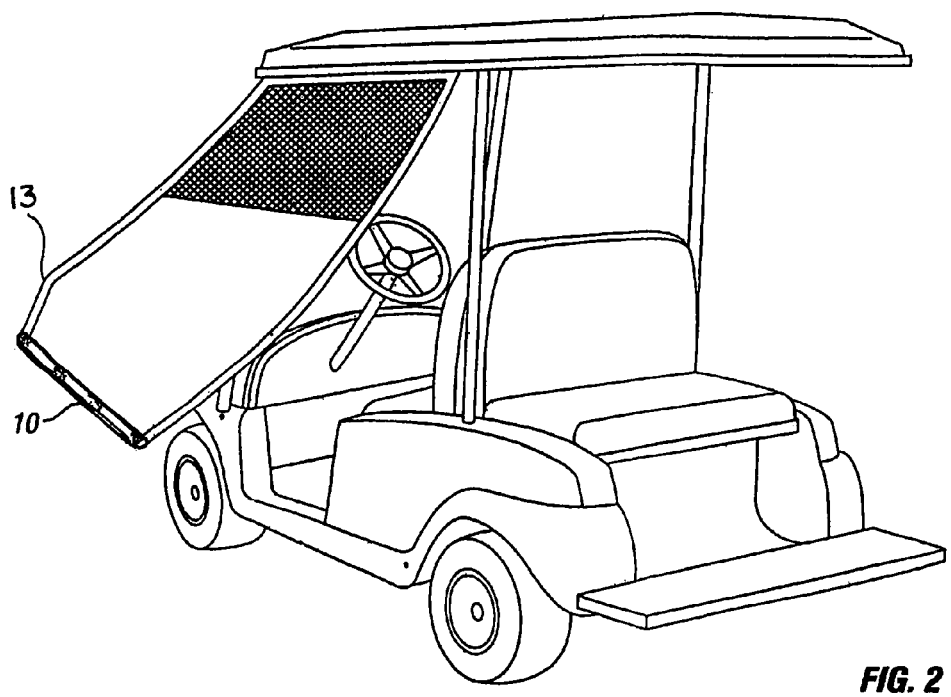
FIG. 2 is a rear perspective view showing the curtain in an open position with the pipe installed on the bottom edge.

FIG. 1 shows a rear view of the front curtain of a golf cart in a closed position as indicated by the bottom edge 12. Also shown are the pipe 10, having the slot 11 formed from end to end. The pipe 10 is made from three quarter inch diameter commercially available PVC pipe which has been cut in forty inch lengths. The pipe 10 is then cut down one side, along the entire length, with a table saw using a dado blade. The cut 11 is wide enough to fit over the entire bottom edge 12, FIG. 2 is a rear perspective view showing the curtain in an open position with the pipe 10 installed on the bottom edge 12. The folded bottom edge 12 is large enough to be held in place as the curtain is rolled up.

Figure 3:
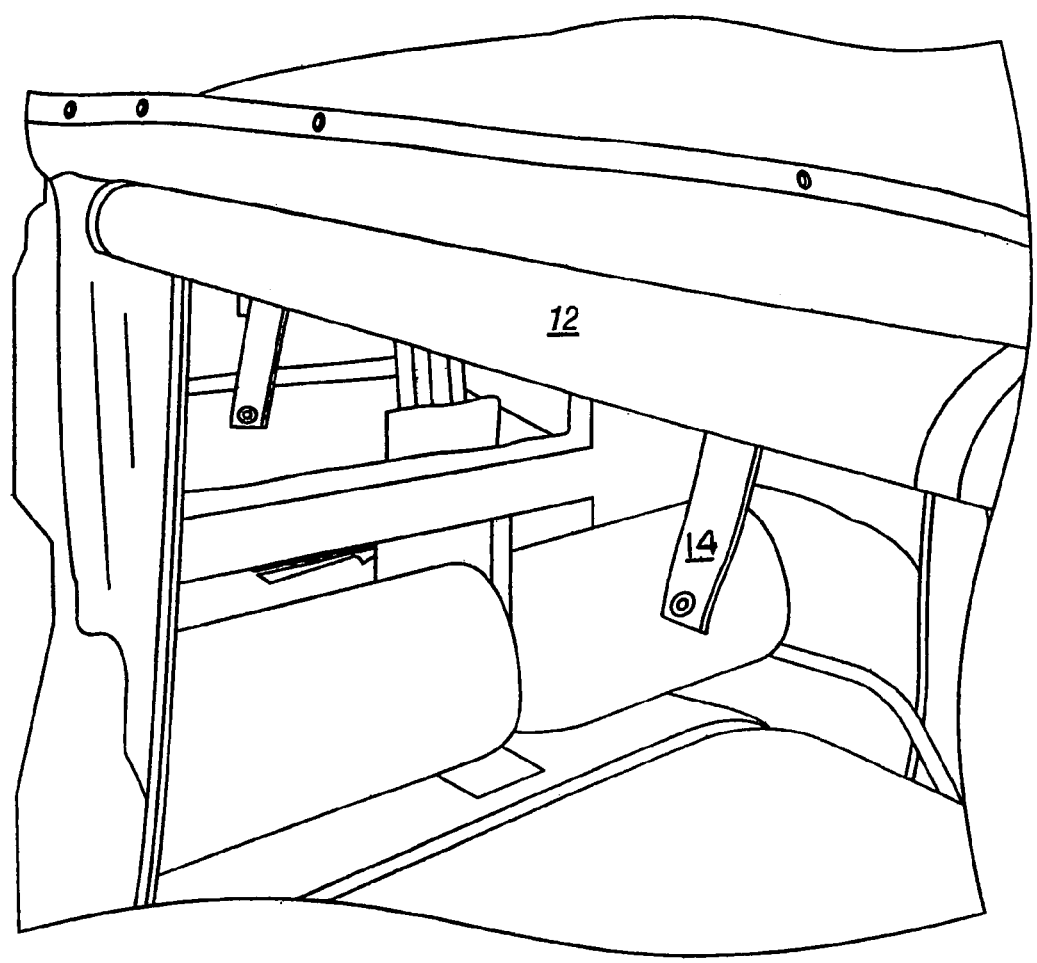
FIG. 3 is a perspective view of the curtain of the present invention in a closed position.

FIG. 3 is a perspective view of the curtain of the present invention in a closed position. Once the curtain having the pipe 10 enclosure has been rolled up and snapped in place, the E Z Roller pipe 10 is removed by pulling it out.

Figure 4:
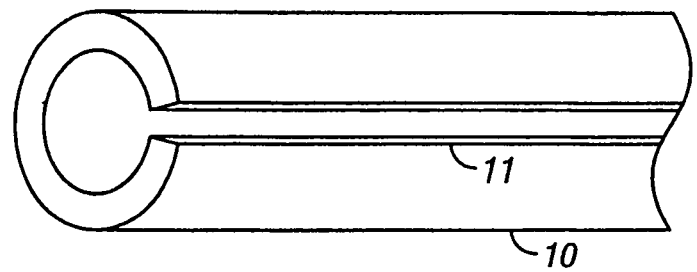
FIG. 4 is a sectional view of the pipe.

FIG. 4 is a sectional view showing a close-up view of the cut 11.

Figure 5:
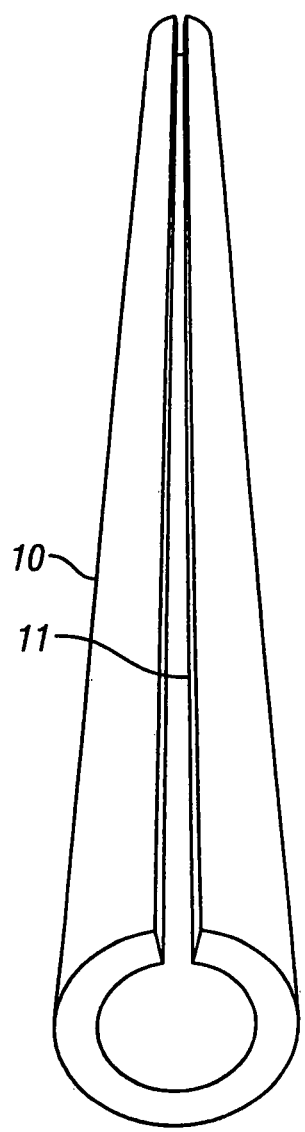
FIG. 5 is a top perspective view of the full length of the pipe showing the slot cut along the entire surface.

FIG. 5 is a top perspective view of the entire length of the pipe 11 showing the slot 11 along the entire surface.

While the present invention has been illustrated and described as embodied in an exemplary embodiments, e.g., embodiment having particular utility for roll-up doors having flexible curtains, it is to be understood that the present invention is not limited to the details shown herein, since it will be understood that the various omissions, modifications, substitutions and changes in the forms and details for the disclosed bottom bar apparatus and roll-up doors and their operation may be made by those skilled in the art without departing in any way from the spirit and scope of the present invention. For example, those of ordinary skill in the art will readily adapt the present disclosure for various other applications without departing from the spirit or scope of the present invention.

I claim:

1. A roll-up golf cart side curtain comprising:
    a flexible sheet forming the curtain for closing a doorway, having an upper end, a lower end and two opposite side edges, said sheet having curtain retension fasteners located along two side edge sections thereof, a first side edge having an extended flap formed therein, and
    a rigid, slotted pipe installed on the bottom of said lower end, said pipe providing a smooth surface for rolling the curtain upwardly to a fully open position.

2. A roll-up golf cart side curtain as set forth in claim 1, wherein said rigid, slotted pipe consists of a three quarter inch PVC pipe having a slot cut therein along the entire length.

\* \* \* \* \*